United States Patent
Caiafa

(10) Patent No.: US 10,250,156 B2
(45) Date of Patent: Apr. 2, 2019

(54) CRYOGENIC FUEL POWER SYSTEM

(71) Applicant: General Electric Company, Schenectady, NY (US)

(72) Inventor: Antonio Caiafa, Albany, NY (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 15/399,287

(22) Filed: Jan. 5, 2017

(65) Prior Publication Data
US 2018/0191262 A1 Jul. 5, 2018

(51) Int. Cl.
| | | |
|---|---|---|
| F02C 7/16 | (2006.01) | |
| H02K 7/18 | (2006.01) | |
| H02M 7/00 | (2006.01) | |

(52) U.S. Cl.
CPC ............... *H02M 7/003* (2013.01); *F02C 7/16* (2013.01); *H02K 7/1807* (2013.01);
(Continued)

(58) Field of Classification Search
CPC ... F01K 7/00; F01K 7/025; F01K 7/16; F01K 7/22; F01K 23/103; F01K 25/00; F01K 25/10; F01K 27/00; Y02E 60/147; F02C 1/05; F02C 1/08; F02C 6/14
USPC ......... 60/645, 647, 651, 652, 653, 659, 662, 60/663, 670, 671, 672, 679, 707, 715, 60/716, 682, 684
See application file for complete search history.

(56) References Cited

U.S. PATENT DOCUMENTS 4,844,117 A * 7/1989 Sung ....................... F16K 21/18
137/386
8,423,103 B2 4/2013 Hennessy et al.
(Continued)

FOREIGN PATENT DOCUMENTS

| CN | 104753377 A | 7/2015 |
|---|---|---|
| CN | 204465379 U | 7/2015 |

(Continued)

OTHER PUBLICATIONS

Khoucha, Farid, et al.; "Hybrid Cascaded H-Bridge Multilevel-Inverter Induction-Motor-Drive Direct Torque Control for Automotive Applications", Industrial Electronics, IEEE Transactions on, http://ieeexplore.ieee.org/xpl/freeabs_all.jsp?arnumber=5345720, vol. 57, Issue 3, pp. 892-899, Mar. 2010.

(Continued)

*Primary Examiner* — Mark A Laurenzi
*Assistant Examiner* — Mickey H France
(74) *Attorney, Agent, or Firm* — GE Global Patent Operation; Nitin Joshi

(57) ABSTRACT

A cryogenic fuel power system includes an engine. The cryogenic fuel power system includes a cryogenic fuel supply that supplies cryogenic fuel to be used as fuel by the engine. The cryogenic fuel power system includes a cryogenic bus configured to provide the cryogenic fuel from the cryogenic fuel supply to the engine. The cryogenic fuel power system includes power electronics circuitry that converts power from the engine into a form to be applied to one or more loads. The power electronics circuitry is positioned in thermal communication with the cryogenic bus to transfer heat from the power electronics circuitry to the cryogenic fuel.

17 Claims, 8 Drawing Sheets

(52) U.S. Cl.
CPC .. *F17C 2221/012* (2013.01); *F17C 2221/033* (2013.01); *F17C 2223/0161* (2013.01); *F17C 2223/033* (2013.01); *F17C 2225/0123* (2013.01); *F17C 2227/0302* (2013.01); *F17C 2227/0393* (2013.01); *F17C 2265/066* (2013.01); *F17C 2270/0168* (2013.01); *Y02T 10/32* (2013.01)

(56) References Cited

U.S. PATENT DOCUMENTS

| | | |
|---|---|---|
| 2005/0155353 A1 | 7/2005 | Sabatino et al. |
| 2010/0014325 A1* | 1/2010 | Raju .................... H02M 5/271 363/37 |
| 2010/0290258 A1 | 11/2010 | Sullivan |
| 2011/0271655 A1 | 11/2011 | Poisson |
| 2016/0025339 A1* | 1/2016 | Kamath ................. B64D 37/30 60/782 |

FOREIGN PATENT DOCUMENTS

| | | | |
|---|---|---|---|
| CN | 104821734 A | 8/2015 | |
| EP | 2 644 508 A1 | 10/2013 | |
| WO | WO 9942706 A1 * | 8/1999 | ............. F01K 27/02 |

OTHER PUBLICATIONS

Freitas, Christopher; "How Inverter Work", Home Power, http://www.homepower.com/articles/solar-electricity/equipment-products/how-inverters-work, issue 135, Feb./Mar. 2010.

Thirumuraugan, P. et al.; "Closed Loop Control of Multilevel inverter Using SVPWM for Grid Connected Photovoltaic System", International Journal of Advanced Research in Electrical, Electronics and Instrumentation Engineering, http://www.ijareeie.com/upload/april/1A_Closed%20Loop.pdf, vol. 2, Issue 4, Apr. 2013.

"MTECH Labs News Announcements", MTECH Laboratories, LLC, http://www.mtechlabs.com/news.html, 2014.

Prasad, A Uma Siva Naga; "High Efficiency Three Phase Transformer Less Mosfet Inverter to Drive Pmsm Motor", Int. J. Elec &Electr.Eng&Telecoms,http://ijeetc.com/ijeetcadmin/upload/IJEETC_55ccb1e1746e6.pdf, vol. 4, Issue 3, Jul. 2015.

Extended European Search Report and Opinion issued in connection with corresponding EP Application No. 17209741.2 dated Jun. 6, 2018.

* cited by examiner

CRYOGENIC FUEL POWER SYSTEM

BACKGROUND

The subject matter disclosed herein relates to power systems, and more particularly, to a multilevel inverter that converts power for cryogenic power systems.

Cryogenic power systems, as used herein, are those that include a cryogenic fuel used by an engine to produce power. For instance, cryogenic fuel may be stored as a liquid and, to be used, may be provided to a vaporizer that vaporizes the fuel to be used by the engine. The engine may then combust the vaporized fuel to produce mechanical power that may then be converted to electrical power. The electrical power may then be converted to a form suitable for powering one or more loads using power electronics circuitry.

Cryogenics may be used in a wide variety of applications, such as automotive, locomotive, aerospace, or stationary, among others. In some of these applications, less weight and/or space occupied by the cryogenic power system may result in increased power density. However, some of the components, such as the vaporizer and the power electronics circuitry, may increase the size and/or weight of the cryogenic power system.

BRIEF DESCRIPTION

In one embodiment, a cryogenic fuel power system includes an engine, a cryogenic fuel supply that supplies cryogenic fuel to be used as fuel by the engine, a cryogenic bus that provides the cryogenic fuel from the cryogenic fuel supply to the engine, and power electronics circuitry that converts power from the engine into a form to be applied to one or more loads, wherein the power electronics circuitry is positioned in thermal communication with the cryogenic bus to transfer heat from the power electronics circuitry to the cryogenic fuel.

In another embodiment, a method includes flowing a cryofuel from a cryofuel storage to an engine configured to combust a gas generated from the cryofuel, between the cryofuel storage and the engine, flowing the cryofuel proximate to power electronics circuitry to reduce a temperature at which the power electronics circuitry operates, and operating the cooled power electronics circuitry to convert electrical power generated by the combustion of the gas by the engine into a form to be applied to one or more loads.

In another embodiment, a power system includes a vaporizer configured to receive cryofuel and to vaporize the cryofuel into a gas, an engine configured to receive the gas and to produce rotational energy to be converted to electrical power, a cryofuel supply configured to provide cryofuel to the vaporizer, power electronics circuitry configured to convert the electrical power into a form to be applied to one or more loads, wherein the power electronics circuitry is configured to be positioned in thermal communication with the cryofuel to transfer heat produced from operation of the power electronics circuitry to the cryogenic fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
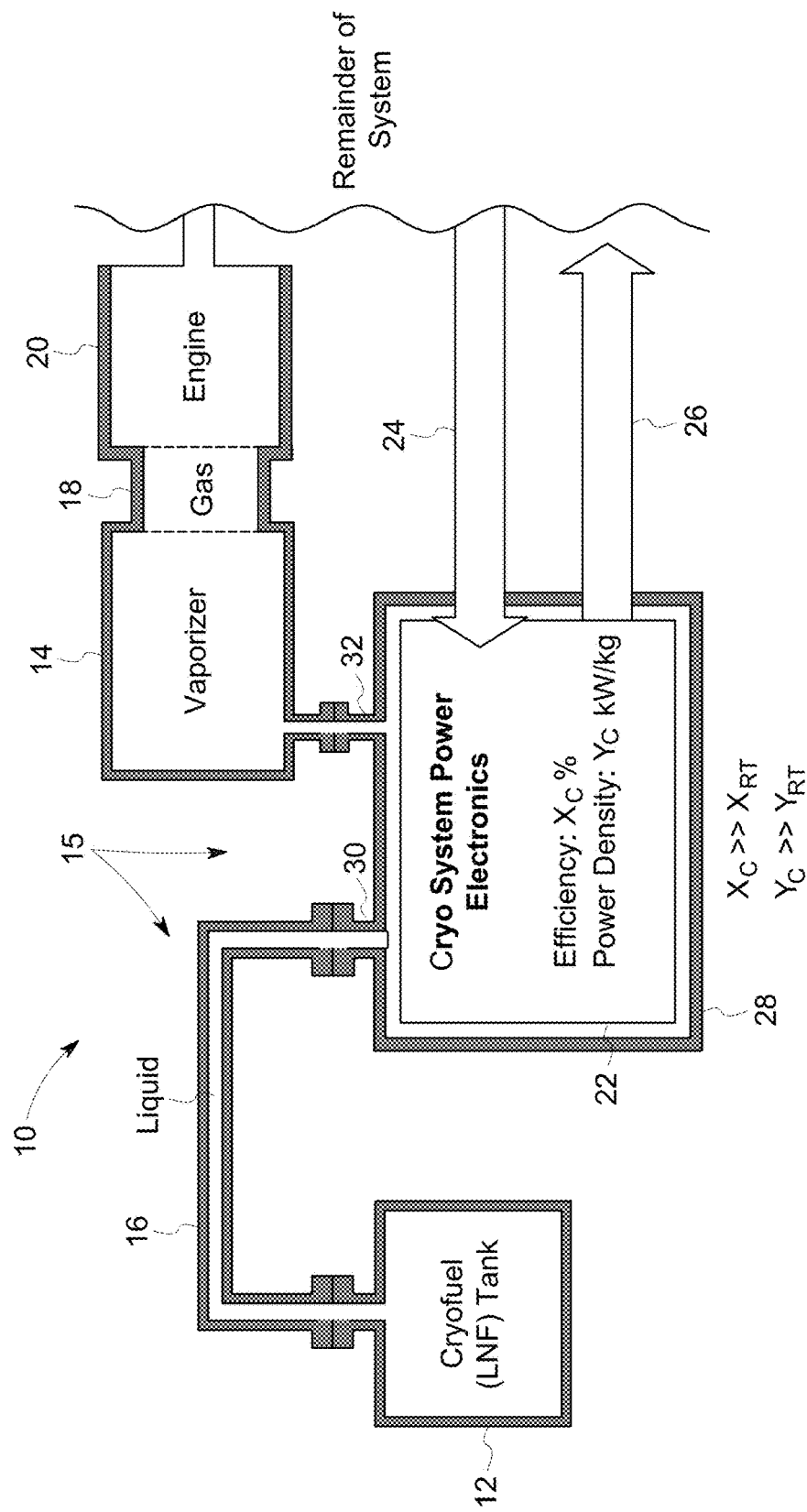
FIG. 1 is a block diagram of a cryogenic fuel (cryofuel) power system having power electronics circuitry cooled by the cryofuel prior to the cryofuel entering a vaporizer, in accordance with aspects of the present disclosure.

The subject matter disclosed herein relates to power electronics circuitry for use in cryogenic power systems that utilize cryogenic fuel to produce electrical power. Cryogenic fuel (cryofuel), as used herein, refers to fuel stored at temperatures at which the fuel is in a liquid state (i.e., below its boiling point at a given pressure), such as liquefied natural gas (LNG) Hydrogen and others. In conventional systems, the liquid cryofuel may flow from a supply or storage to a vaporizer that heats (or reduces the pressure of) the fuel to transform the fuel from the liquid state into a gaseous state. The gaseous fuel may then be provided to an engine, such as an internal combustion engine, which combusts the gas to generate mechanical motion. The mechanical motion may drive a generator to produce electric power. Power electronics circuitry of the cryogenic power system may convert the electric power into a form suitable to be applied to one or more loads. Further, the power electronics circuitry may include hardware, such as a compressor, heat exchanger, among others, to control the temperature of the power electronics circuitry.

The size and/or weight of the vaporizer may depend on the amount of heat and/or expansion volume that is used in the gasification process to convert the cryofuel from a liquid to a gas. That is, the larger the vaporizer, the more heat and/or expansion space the vaporizer may provide to the cryofuel. As such, the vaporizer may take up an amount of space and weight suitable to vaporize the cryofuel to a specified volume or flow rate gaseous fuel. Similarly, the designed size of the power electronics circuitry depends on the amount of power and energy controlled from the power electronics circuitry. As power density refers to the amount of power conditioned per unit weight or volume, it is desirable to reduce the amount of space occupied by the vaporizer as well as reduce the amount of space occupied by the power electronics circuitry to improve the power density. Likewise it is of interest to decrease the weights of these elements to further improve the overall power density.

Embodiments of the present disclosure improve the power density of the cryogenic power system by transferring heat from the power electronics circuitry to the cryofuel to increase the temperature of the cryofuel while being transported to the vaporizer while simultaneously reducing the temperature of the power electronics. That is, present embodiments may include a conduit from the cryofuel supply to an enclosure of the power electronics circuitry to cool the power electronics circuitry and to heat the cryofuel as it flows toward the vaporizer. Thus the enclosure may include a conduit to provide the cryofuel to the vaporizer (after cooling the power electronics) at a temperature greater than would occur if the cryofuel were instead directly routed to the vaporizer, without cooling the power electronics. As such, the vaporizer may be of a reduced size, or even eliminated, due to the heating of the cryofuel by the power electronics circuitry.

Further, the power electronics circuitry operated at cryogenic temperatures occupies much less volume (and weighs less) than power electronics circuitries operated at high temperatures that process the same quantity of power.

Further, the power electronics circuitry may include circuitry of a reduced size due to operating the power electronics circuitry at a temperature lower than would occur if not cooled by the flow of cryofuel. For example, the power electronics circuitry may be reduced in size by not including a compressor or heat exchanger (or using a smaller compressor or heat exchanger than would otherwise be the case) due to the cooling provided by the flow of cryofuel. As such, the power density of the cryogenic power system may be improved by reducing the size of the vaporizer and/or the power electronics circuitry.

Moreover, in some embodiments, the power electronics circuitry may include circuitry that provides electric power to the one or more loads without an output filter to improve the efficiency of the cryogenic power system as well as further reducing its size. That is, conventional inverters may use passive filtering to provide power to the one or more loads. However, the passive filter may include an inductor large enough that the cryogenic temperature can affects its magnetic field and the ones produced by other inductors embedded in the cryogenic power system, thereby decreasing the efficiency of the cryogenic power system. As such, the power electronics circuitry of present embodiments may provide power output with much reduced or even without the use of passive filtering.

To provide power conversion without the use of a passive filter, the power electronics circuitry may include at least two resonant phases that divide input power over each of the resonant phases. The power electronics circuitry may include a transformer for each of the phases. For example, each of the resonant phases may be coupled to primary windings of a respective transformer. Secondary windings of each of the transformers may be coupled to a respective controlled rectifier. By splitting the power conversion over multiple phases, power through each of the phases may be reduced, thereby allowing for the use of components that are designed to withstand less power on each phase. Each of the phases may include circuitry to provide a portion of a total power output based on a reference output. By dividing power over multiple phases, the power electronics circuitry may provide power at steps that do not include frequencies of harmonics that were filtered by passive filters.

With the preceding introductory comments in mind, FIG. 1 shows a block diagram of a cryogenic fuel (cryofuel) power system 10 that uses cooled fuel, such as liquefied natural gas, stored at temperatures at which the fuel is in a liquid state. The cryofuel power system 10 may include a cryofuel supply 12, such as a cryofuel tank which may be insulated or actively cooled. The cryofuel power supply 10 may further include a cryogenic bus 15 having a conduit 16 that provides liquid cryogenic fuel from the cryofuel supply 12 to a vaporizer 14 to be gasified. The vaporizer 14 may provide heat (and/or reduced pressure in the form of expansion space) to the liquid fuel to vaporize the fuel into a gas 18. An engine 20 may receive the gas and combust the gas 18 to produce mechanical motion. The engine 20 may be any engine suitable for providing mechanical motion from vaporized cryofuel, such as an internal combustion engine, gas engine, or the like. The mechanical motion may then be converted to electrical power via a generator.

The cryofuel power system 10 may include power electronics circuitry 22 described below to convert the electrical power to a form suitable for powering one or more loads in various applications, such as powering a power grid, a locomotive, a vehicle (e.g., a truck, a car, a ship, or an airplane). The cryofuel power system 10 includes one or more connections 24 (e.g., power, control, communication, or logic connections) to provide the power electronics circuitry 22 with power, control, communication, logic, or any combination thereof. The cryofuel power system 10 further includes one or more connections 26 (e.g., power, control, communication, or logic connections) to provide power to the one or more loads.

In some of these applications, it may be desirable to improve the power produced per unit mass of the cryofuel system, referred to as the power density, without reducing the efficiency of the system. During the power conversion process, the power electronics circuitry 22 may produce an amount of heat due to electrical resistances and/or impedances present in the system during operation. The heat may reduce the efficiency of the power electronics circuitry 22 and increase the wear on the circuitry. As such, some embodiments of the cryofuel power system 10 may include additional hardware, such as fans, heat exchangers, or the like, to reduce the heat on the power electronics circuitry 22 or to otherwise maintain the thermal environment of the power electronics circuitry 22 within certain specified operational bounds.

Moreover, the vaporizer 14 may be designed to be of a size and/or power sufficient to provide an amount of heat or volume sufficient to vaporize a working volume or flow rate of the natural gas from a liquid state to a gaseous state during operation. Thus, the volume and/or mass of the vaporizer 14 may depend, at least in part, on the temperature of the natural gas prior to entering the vaporizer and the desired temperature of the natural gas after heating. That is the differential between the inlet temperature of the liquid fuel and the outlet temperature of the vaporized fuel during operation will typically determine the operational parameters designed into the vaporizer, such as volume (e.g., size) and/or heat generating capacity. As such, the cryofuel power system 10 typically includes a vaporizer 14 that is of a size and power to provide heat to heat the natural gas from a temperature of the supplied natural gas to a temperature suitable for operations of the engine 20. However, both the additional hardware to cool the power electronics circuitry and the size and power of the vaporizer 14 reduce the power density of the cryofuel power system 10.

In accordance with the present approach, the heat generated by the operation of the power electronics circuitry 22 is used to heat or pre-heat the fuel (e.g., liquefied natural gas) prior to entering the vaporizer 14. This, thereby reduces the differential between the entry (i.e., inlet) and exit (i.e., outlet) temperature of the fuel with respect to the vaporizer, and thus reduces the degree to which the fuel is heated in the vaporizer to achieve the desired expansion to a gas.

By way of example, the cryogenic bus 15 may include an enclosure that includes a housing of the power electronics 22. The enclosure 28 is coupled between the conduit 16 and the vaporizer 14. The housing of the power electronics circuitry 22 may be positioned proximate to the cryogenic bus 15 to transfer heat from the power electronics circuitry to the cryogenic fuel when the fuel flows to the vaporizer 14. In the illustrated embodiment, the housing of the power electronics is positioned within the enclosure such that heat may be transferred between the housing and the cryofuel. That is, the enclosure 28 receives the liquid cryofuel from the conduit 16 at an inlet 30 and heat from operation of the power electronics circuitry 22 is transferred to (i.e., heats) the fuel to reduce the operating temperature of the power electronics circuitry 22 while increasing the temperature of the cryofuel. While housing the power electronics circuitry 22 within the enclosure is used as an example, any suitable method of cooling the power electronics using the cryofuel may be used. The natural gas may exit the enclosure 28 via the outlet 32 that couples the vaporizer 14 to the enclosure 28. While the embodiment described above includes an enclosure to remove heat from the power electronics 22, in other embodiments, the power electronics may be directly cooled by being submerged within the cryofuel.

By reducing the temperature of the power electronics circuitry 22 using the cryofuel (i.e. liquefied natural gas), hardware components that are otherwise used to cool the power electronics circuitry 22 may be reduced or eliminated. Further, by heating the cryofuel (i.e. liquefied natural gas) prior to entering the vaporizer 14 using the heat from the power electronics circuitry 22, the cryofuel power system 10 may eliminate or reduce the size and/or power of the vaporizer 14 as compared to a vaporizer 14 that is sized to provide all of the heat needed to vaporize the fuel, i.e., heat without the added heat from the power electronics circuitry 22. Additionally and/or alternatively, the vaporizer 14 may use less energy due to the heat from the power electronics circuitry 22 raising the temperature of the fuel entering vaporizer 14 from what it would otherwise be.

In the cryofuel power system 10, circuitry that includes materials that create a magnetic field may have increased losses due to the low temperature associated with cryogenics. For example, conventional inverters may include a passive filter to filter the output and to reduce total harmonic distortion (THD). However, passive filters may include an inductor that creates a magnetic field which interacts with the cryofuel, increasing losses of the power electronic circuitry 22 and, consequently, of the power system 10. As such, the power electronics circuitry 22 described below may provide electrical power to one or more loads with reduced or eliminated magnetic materials. For instance, the power electronics circuitry 22 may operate without the use of a passive filter (e.g., that filters the output of the inverter) while creating minimal THD.

Figure 2:
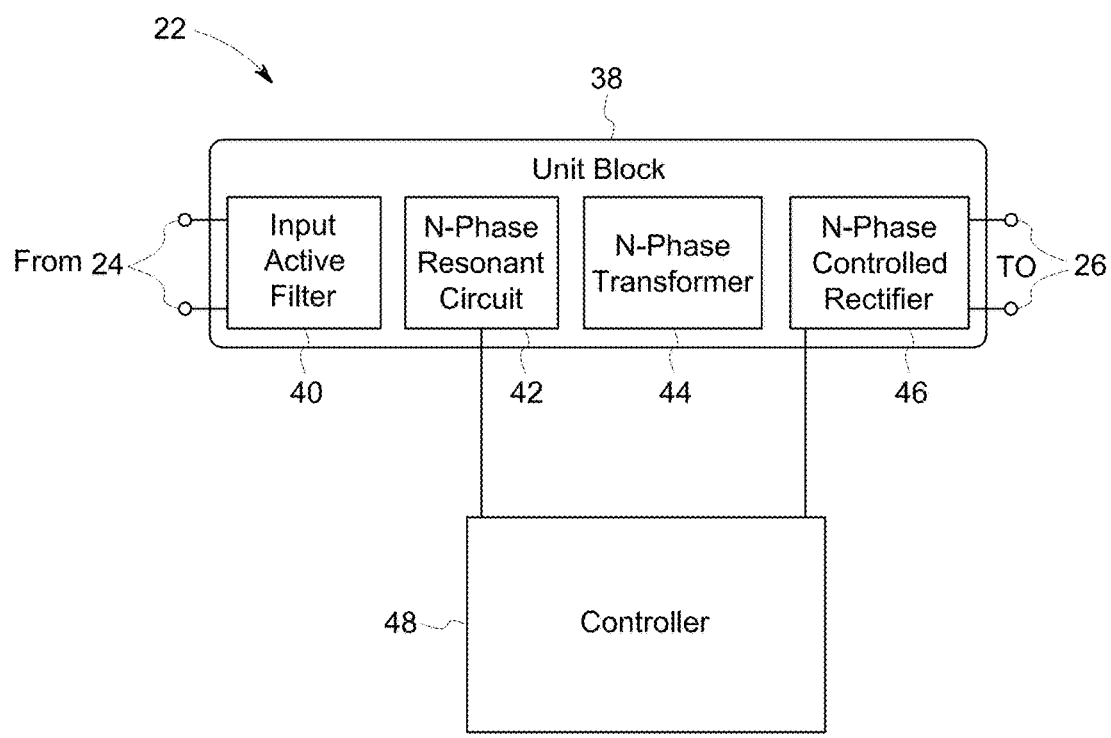
FIG. 2 is a block diagram of the power electronics circuitry of FIG. 1 having a single unit of a multilevel inverter, in accordance with aspects of the present disclosure.

FIG. 2 shows a block diagram of a unit block 38 of the power electronics circuitry 22. The power electronics circuitry 22 may receive power via the connections 24. The power electronics circuitry 22 may include an active filter 40 that filters the input power. The power electronics circuitry 22 may include an N-phase resonant circuit 42 that receives the power from the active filter 40 and divides the power into N-phases. The number of phases may depend on the application, and N-phases refers to any suitable number of phases. Each phase of the N-phase resonant circuit 42 may be electrically coupled to primary windings of a respective phase of the N-phase transformer 44. The power electronics circuitry 22 may include an N-phase controlled rectifier 46 that provides the power output to the connections 26. Each phase of the N-phase controlled rectifier 46 may be electrically coupled to a respective secondary winding of the N-phase transformer 44. The power electronics circuitry 22 may include a slave controller 48 that controls operation of the N-phase resonant circuit 42 and/or the N-phase controlled rectifier 46.

The slave controller 48 may be electrically coupled to the power electronics circuitry 22 to receive and/or provide signals to control various parts of the power electronics circuitry 22. For example, the slave controller 48 may include a sensor that receives a first signal indicating the power output of the connections 26. Further, the slave controller 48 may send signals to control operation of the N-phase resonant circuit 42 and/or the N-phase controlled rectifier 46. Further it may include an output current sensor as well as an input voltage sensor. Furthermore, the slave controller 48 may receive a reference signal (voltage, current and/or power) from a master control.

Figure 3:
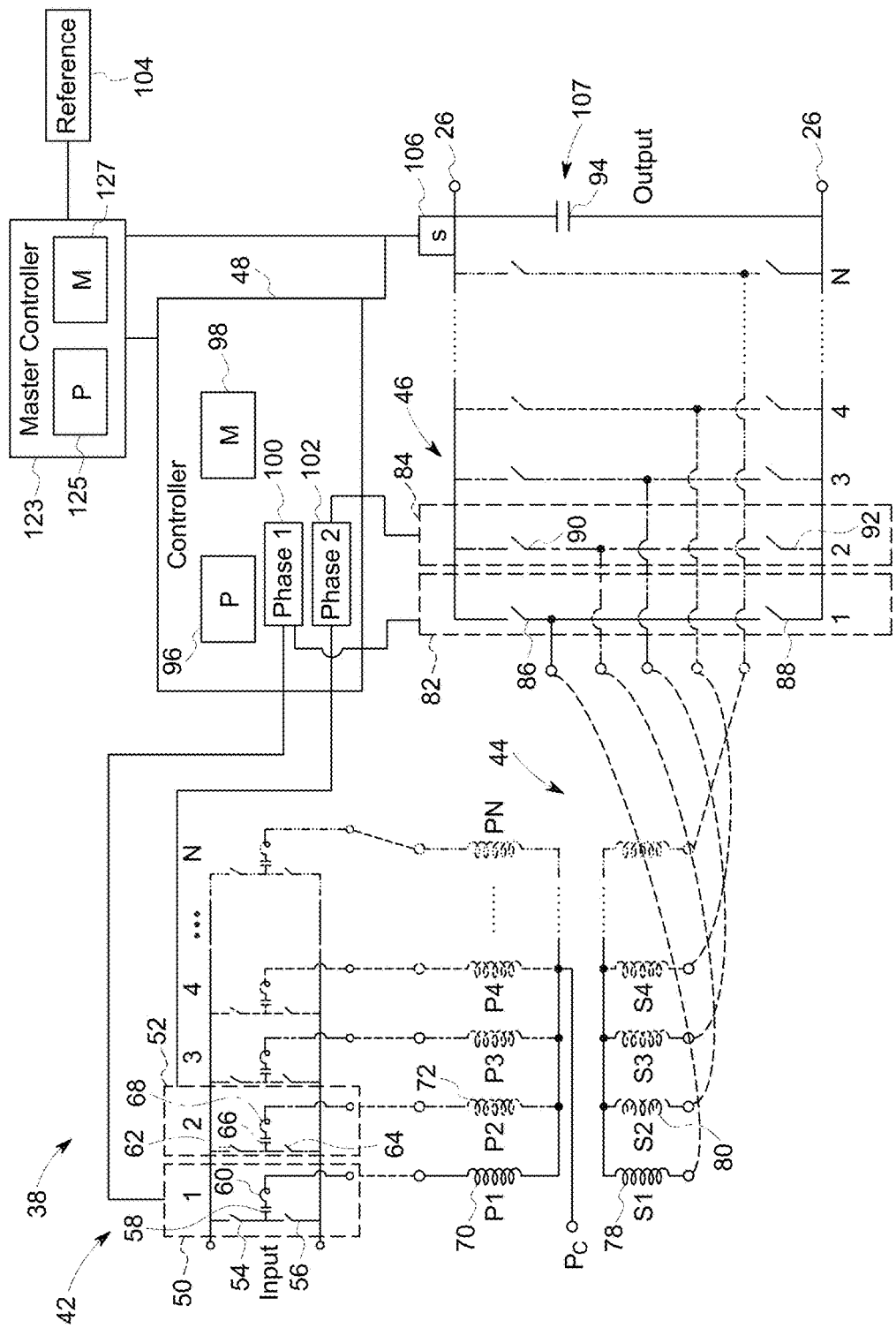
FIG. 3 is a schematic diagram of the single unit of a multilevel inverter of FIG. 2, in accordance with aspects of the present disclosure.

FIG. 3 shows a circuit diagram of an embodiment of the unit block 38 of the power electronics circuitry 22. The phases below may refer to the legs or set of circuitry that may be included N number of times. While two phases are described in detail with respect to FIG. 3, note that the illustrated embodiment includes any suitable number of phases dependent upon the application. The N-phase resonant circuit 42 of the power electronics circuitry 22 includes at least two phases, referred to here as a first phase resonant circuit 50 and a second phase resonant circuit 52. The first phase resonant circuit 50 includes a first switch 54 and a second switch 56, as well as a capacitor 58 and an inductor 60. The second phase resonant circuit 52 includes a first switch 62 and a second switch 64, as well as a capacitor 66 and an inductor 68. In some embodiments, the first phase resonant circuit 50 and/or the second phase resonant circuit 52 may include a capacitor without an inductor, or an inductor without the capacitor.

The first phase resonant circuit 50 may be electrically coupled to primary windings 70 of a first transformer. In certain embodiments, the transformer may include capacitance and/or inductance in place of a separate capacitor and/or inductor. For example, the first phase resonant circuit 50 may be electrically coupled to the primary windings 70 without the inductor 60 and/or the capacitor 58. The second phase resonant circuit 52 may be electrically coupled to primary windings 72 of a second transformer.

In the illustrated embodiment, the primary windings 70 and 72 of each phase resonant circuit 50 and 52 may induce a voltage in secondary windings 78 and 80, respectively. Further, the secondary windings 78 and 80 may be electrically coupled to a first phase controlled rectifier 82 and a second phase controlled rectifier 84 of the N-phase controlled rectifier 46. The first phase controlled rectifier 82 may include a first switch 86 and a second switch 88, and the second phase controlled rectifier 84 may include a third switch 90 and a fourth switch 92. Additionally, the N-phase controlled rectifier 46 may be coupled to a capacitor 94.

By coupling the first transformer between the first phase resonant circuit 50 and the first phase controlled rectifier 82, the transformer may galvanically isolate power of the first phase resonant circuit 50 from power of the first phase controlled rectifier 82. Similarly, by coupling the second transformer between the second phase resonant circuit 52 and the second phase controlled rectifier 82, the second transformer may galvanically isolate power of the second phase resonant circuit 52 from power of the second phase controlled rectifier 82. As mentioned above, the transformers may include numbers of windings to step up or step down the voltages provided by the transformers to the controlled rectifiers.

Each phase may have hardware similar or identical to hardware of the other phases. In the illustrated embodiment, the capacitor 58 has a capacitance equal to the capacitance of a capacitor 66, and the inductor 60 has an inductance equal to the inductance of an inductor 68. Further, each of the transformers may have a similar or identical relationship of primary windings 70 and 72 to secondary windings 78 and 80. Furthermore, switches 82 and 84 of each of the phases of the N-phase controlled rectifier 46 may be similar or identical to respective switches 86 and 88 of other phases of the N-phase controlled rectifier 46.

In certain embodiments, the slave controller 48 may include various circuitry to perform the methods described herein. As an example, the slave controller 48 may include a processor 96 or multiple processors, memory 98, and/or a field programmable gate array (FPGA) and/or a complex programmable logic device (CPLD). The slave controller 48 may include circuitry and/or instructions to control the each of the N-phases, as shown by the first phase circuitry 100 and second phase circuitry 102. The slave controller 48 may operate as a master over the first phase circuitry 100 and the second phase circuitry 102. The processor may be operatively coupled to the memory to execute instructions for carrying out the presently disclosed techniques, such as controlling operation of the switches 54, 56, 62, 64, 86, 88, 90, and 92. These instructions may be encoded in programs or code stored in a tangible non-transitory computer-readable medium, such as the memory and/or other storage. The processor may be a general purpose processor, system-on-chip (SoC) device, or application-specific integrated circuit, or some other processor configuration.

Memory 98, in the embodiment, may include a computer readable medium, such as, without limitation, a hard disk drive, a solid state drive, a diskette, a flash drive, a compact disc, a digital video disc, random access memory (RAM), firmware, read only memory (ROM, EPROM, flash memory, etc.) and/or any suitable storage device that enables processor to store, retrieve, and/or execute instructions (e.g., code) and/or data. Memory 98 may also include one or more local and/or remote storage devices.

The slave controller 48 may receive control signal(s) from a master controller 123, described in detail below. For example, the master controller 123 may receive a reference signal indicating a desired output, such as a signal of a power grid. Further, the master controller 123 may receive a sensor signal from a sensor 106 (e.g., voltage and/or current sensor) indicating the power output on the connections 26. Alternatively and/or additionally, the slave controller 48 may receive signals from the sensor 106. As described in detail below, the master controller 123 may send signal(s) to the slave controller 48 to cause the slave controller 48 to control the switches to output power based on the reference signal 104 and the sensor signal(s). The input power may then be divided into N-phases via an N-phase resonant circuit 42. By dividing the power between each of the phases, the power electronics circuitry 22 may provide controlled power while minimizing losses by operating at lower current per phase as compared to inverters that do not include N-phases. Moreover, by dividing the power into different phases, the circuitry (e.g., switches, capacitors, inductors, transformers, etc.) on each of the phases may be rated to withstand reduced current and/or voltages as compared to power electronics circuitry 22 that does not divide the power into different phases. Further, by limiting the output current of each phase, magnetic fields generated by current of the inverter may be limited, thereby reducing losses of the power electronics circuitry 22 in cryofuel power systems 10. In the illustrated embodiment, the output ripple frequency may be equal to 2N times the switching frequency, where N is the number of phases of the N-phase. As such, the output ripple may be minimized based on the switching frequency per phase and the number of phases. Further, a capacitor 107 may smooth the output of the inverter. Furthermore, because of the high ripple frequency, a filter inductor is much smaller or it could be removed completely compared to a traditional approach. As described below, more than one unit block 38 may be combined together to form a multi-level inverter of the power electronics circuitry 22. The multi-level inverter 101 may be modular such that each of the unit blocks 38 are self-contained to enable changing of the multi-level inverter 101 depending on the application.

Figure 4:
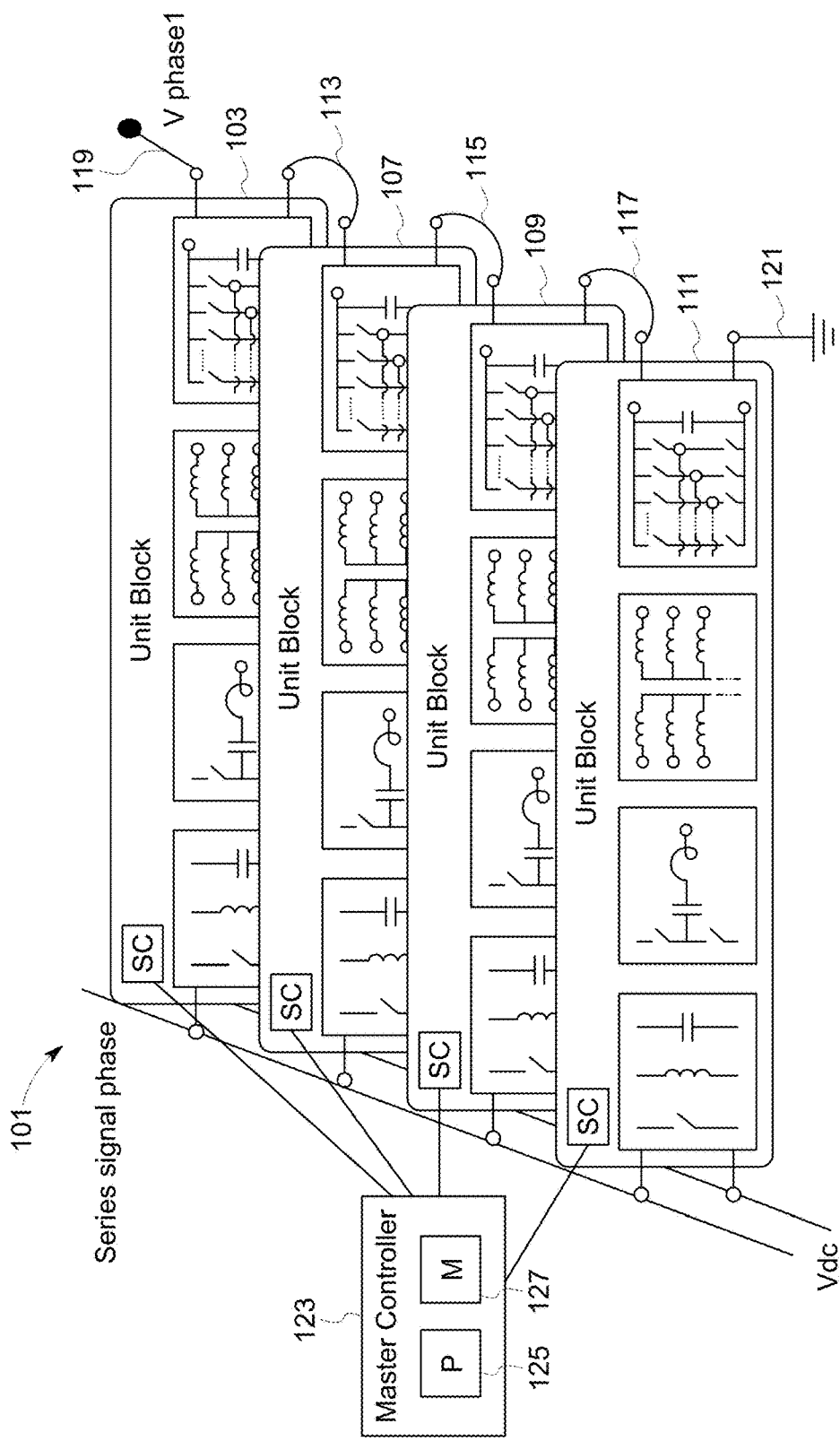
FIG. 4 is a block diagram of a set of units from FIG. 3 in a multilevel inverter, in accordance with aspects of the present disclosure.

FIG. 4 shows a multi-level inverter 101 having multiple unit blocks 103, 107, 109, and 111. Although four unit blocks are shown in FIG. 4, this is simply meant to be illustrative, and any suitable number of unit blocks may be used. Each of the unit blocks may include the power electronics circuitry 38 described above, such as the input active filter 40, the N-phase resonant circuit 42, the N-phase transformer 44, the N-phase controlled rectifier 46, as well as the slave controller 48.

In the illustrated embodiment, unit block 103 is connected in series via connection 113 to unit block 107. Further, unit block 107 is connected in series, via connection 115, to unit block 109, which is connected in series via connection 117 to unit block 111. That is, the four unit blocks 103, 107, 109, and 111 are connected in series to one another to provide an output voltage 119 with respect to ground.

The multi-level inverter 101 may include a master controller configured to send signals to control the slave controllers of each of the unit blocks. While wiring is shown in FIG. 4, the master controller may communicate using any suitable communication technique or protocol (e.g., wireless or wired). Further, the master controller 127 may include a processor 125 and a memory 127. The processor 125 and the memory 127 may be any suitable processor and memory (e.g., as described with respect to the slave controller 48). The memory 127 may include instructions to be executed by the processor 125 to perform the techniques described herein.

The processor 125 may send control signals to each of the slave controllers of the unit blocks 103, 107, 109, and 111 to cause the slave controllers to control the switches of the respective unit block 103, 107, 109, and 111 according to control signals of the master controller. The multi-level inverter 101 may provide power at a number of voltage levels corresponding to the number of unit blocks coupled in series. As will be described below, the processor 125 may send control signals to each of the slave controllers to control the switches of the respective unit blocks 103, 107, 109, and 111 to generate a summation waveform based on the control signals.

Each of the unit blocks 103, 107, 109, and 111 may be coupled to the direct current (DC) bus $V_{DC}$. Further, the output of each unit block 103, 107, 109, and 111 is galvanically isolated from the DC bus to float the output of each of the unit blocks 103, 107, 109, and 111 to enable series output connection of multiple modules. That is, each of the unit blocks 103, 107, 109, and 111 may be galvanically isolated so that the series connections 113, 115, and 117 form a summation voltage between the voltage output 119 and ground 121 that combines each voltage output of the unit blocks 103, 107, 109, and 111 (e.g., voltages across connections 26 of each unit block 103, 107, 109, and 111). Further, by coupling the unit blocks 103, 107, 109, and 111 with the series connections, each of the phases of the unit blocks may be coupled in series with one another such that voltages of each of the unit blocks.

Figure 5:
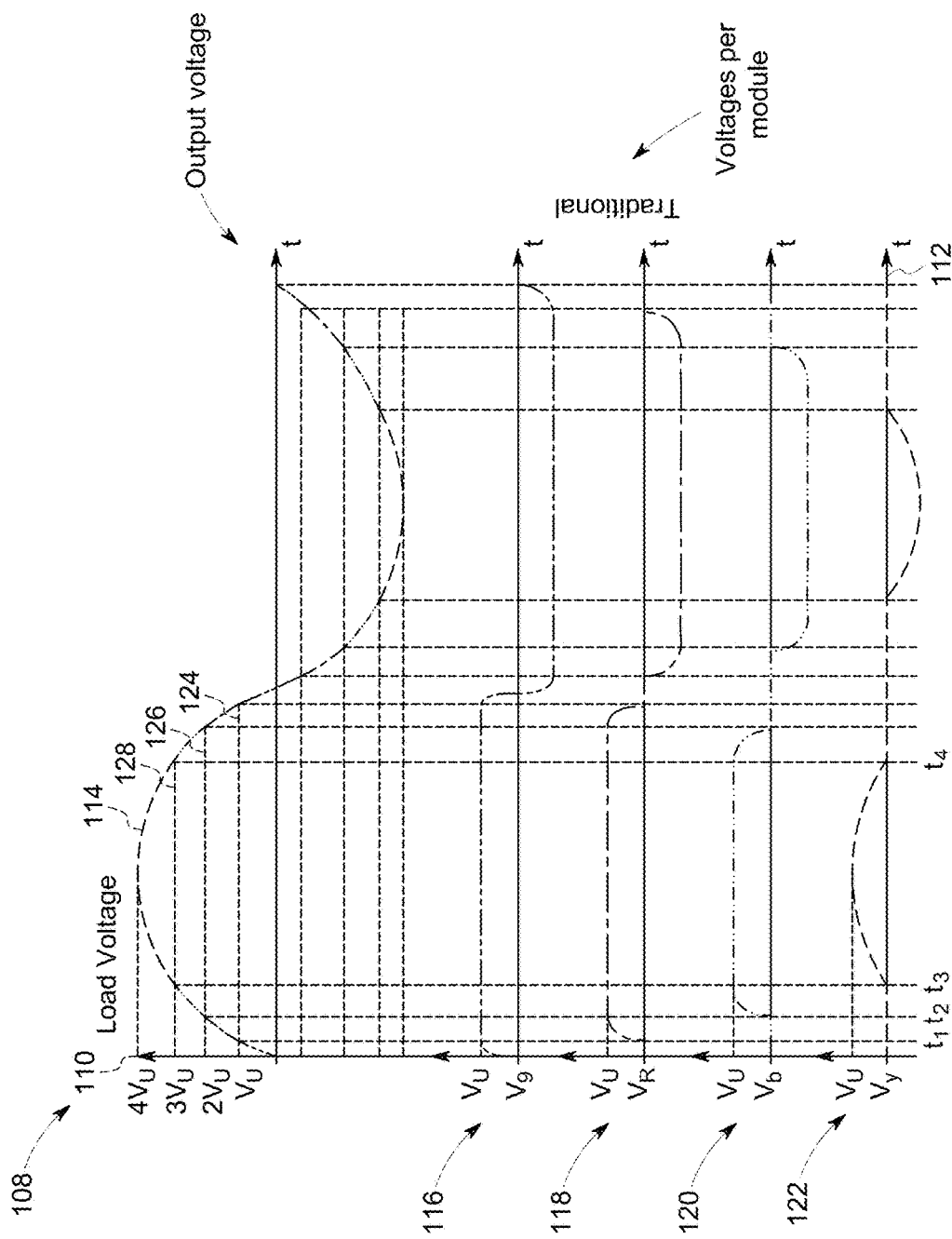
FIG. 5 is a graph of output voltages of each of the units of FIG. 4 which form a summation waveform, in accordance with aspects of the present disclosure.

FIG. 5 shows a graph 108 of output voltages, shown on the ordinate 110, with respect to time, shown on the abscissa 112, of the power output from the multi-level inverter 101 of FIG. 4. The master controller 123, through the controllers 48, may control each of the N-phases of each of the unit blocks 103, 107, 109, and 111 to provide power output that may sum to form a sinusoidal waveform 114. The power electronics circuitry 22 may include four unit blocks, each having N-phase resonant circuit, N transformers, and N controlled rectifiers. Each of the sections 116, 118, 120, and 122 are shown to represent output voltages of each of the unit blocks 103, 107, 109, and 111. As mentioned above, the unit blocks 103, 107, 109, and 111 may be modular, or the N-phases may be combined, depending on the circumstances.

The master controller may send signals to the slave controllers to control operation of the switches of each of the resonant circuits to provide a portion of alternating current (AC) power from the DC bus $V_{DC}$. For example, the slave controller 48 may control operation of the resonant circuit to provide power, as shown in section 116. Due to the components of each of the resonant circuits (e.g., the inductor, the capacitor, etc.) or the transformer, or the controlled rectifier, each unit block 103, 107, 109, and 111 may provide a portion of the AC power with minimal harmonics and/or minimal voltage ripple without the use of passive filtering. For example, the first unit block 103 may be used to provide a first portion of AC power provided by the first resonant circuitry to include a reduced voltage ripple, a reduced ripple frequency, or both. Similarly, the second unit block 107 may include similar or identical components to similarly shape the portion of AC power provided by the second unit block 107 to include a reduced voltage ripple, a reduced ripple frequency, or both, as compared to an inverter without the components of the resonant circuitry (e.g., the inductor, the capacitor, etc.). Further, by dividing the current through multiple phases, via the switches of the resonant circuits, magnetic fields generated by the inverter may be minimized to reduce impact of the inverter on the cryogenic fuel power system. That is, the slave controller may limit current through each of the resonant circuits to reduce or eliminate decreases in efficiency due to magnetic fields at lower temperatures due to the cryogenic fuel.

The master controller 123 may control each of the slave controllers based on the reference signal 104 and the sensor signal. If the master controller 123 determines that the voltage of the reference sinusoidal waveform 114 is below a first threshold 124, then the master controller may send signal(s) to the slave controller of the first unit block 103 to control the first unit block 103 to provide a voltage based on the reference signal 104, and to the other unit blocks 107, 109, and 111 a reference signal equal to 0. For example, the slave controller of the first unit block 103 may control (e.g., send signal(s) to open and/or close) switches of each of the phases of the first unit block 103 to generate an output voltage between time 0 and time t1, as shown by section 116, and the slave controllers of every other unit will operate the switches of the units to generate a zero-value output voltage.

While the reference signal 104 is between the first threshold 124 and a second threshold 126, the master controller 123 may send signal(s) to the slave controller of the first unit block 103 to keep a constant voltage equal to the threshold value, and to the slave controller 48 of the second unit block 107 to control (e.g., send a signal to open) switches of the second unit block 107 to generate the output voltage between t1 and t2, shown by section 118. The unit blocks 109 and 111 will be controlled to produce a zero-voltage output. Similarly, while the reference signal 104 is between the second threshold 126 and a third threshold 128, the master controller 123 may send signal(s) to the slave controller 48 of the third unit block 109 to control (e.g., send a signal to open) switches of the third unit block 109 to generate the output voltage between t2 and t3, as shown by section 120, and send signal(s) to the slave controller of unit blocks 103 and 109 to produce a constant voltage equal to the threshold value, and to the slave control of unit block 111 to produce a zero voltage output. The master controller 123 may then send signal(s) to the slave controller 48 of the fourth unit block 111 to control switches of the fourth phase to generate the output voltage between t3 and t4 while the reference signal is above the third threshold 128, as shown by section 122 and send signal(s) to the slave controllers of unit blocks 103, 107 and 109 to produce a constant output voltage equal to the threshold voltage. The slave controller 48 may continue to control the switches to decrease the voltages in steps in a similar manner such that the summation of each of voltages from each of the unit blocks forms the sinusoidal waveform 114. By increasing and/or decreasing the voltages at steps using each of the unit blocks, the output from the power electronics circuitry 22 does not have harmonics at frequencies that were conventionally filtered by a passive filter. Further, the resonant circuits of each of the phases may shape the portion of AC power provided by each of the phases, as shown by sections 116, 118, 120, and 122, to include a reduced voltage ripple, a reduced ripple frequency, or both, as compared to an inverter without the components of the resonant circuitry.

Figure 6:
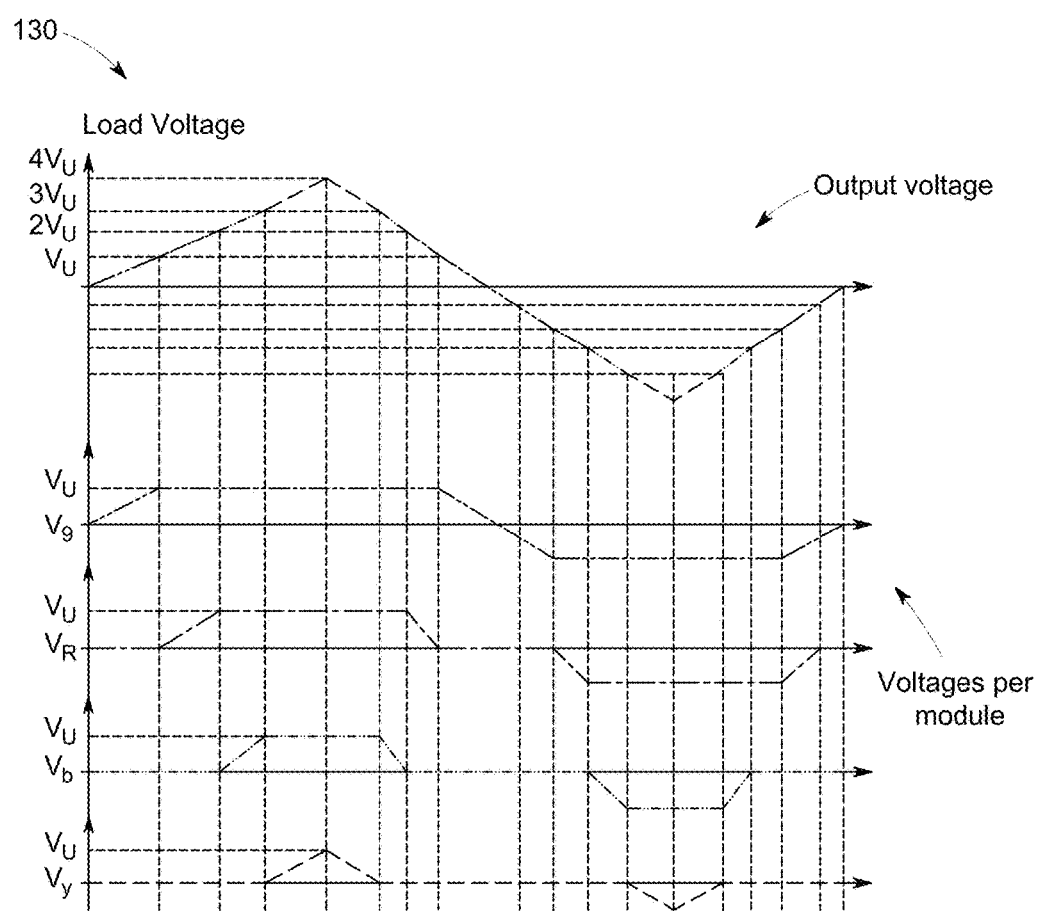
FIG. 6 is another graph of output voltages of each of the units of FIG. 4 which form another summation waveform, in accordance with aspects of the present disclosure.

While a sinusoidal waveform was used as a reference signal, the system and methods described herein may be used with any suitable waveform as a reference signal. FIG. 6 shows a graph 130 of an example of a triangle waveform. While a triangle waveform and a sinusoidal waveform are used here as examples, the power electronics circuitry 22 may be used to generate rectangular, sawtooth, or any other suitable waveform, including direct current (DC) and/or alternating current (AC) waveforms. Similar to FIG. 5, the master controller 123 may send signal(s) to the slave controllers 48 of each of the unit blocks to control each of the phases of the modular multilevel inverter 38 based on the reference signal 104 and the sensor signal. That is, the master controller 123 may compare the voltage of a reference triangle waveform to various threshold to control provide power via each of the phases. Power from each of these phases may be summed into a resultant signal.

Figure 7:
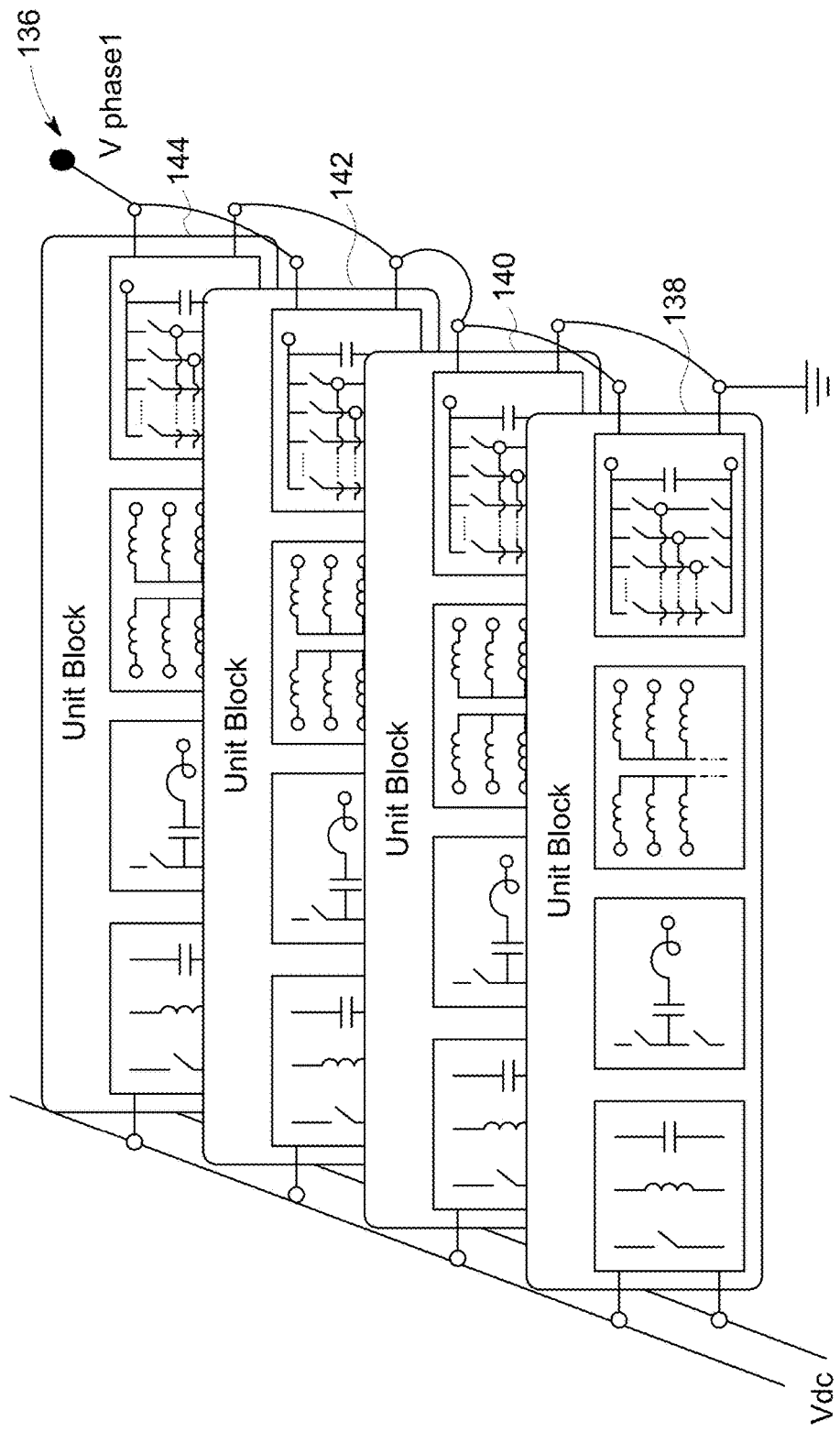
FIG. 7 is a block diagram of four units of FIG. 3 in a multilevel inverter, in accordance with aspects of the present disclosure.

FIG. 7 shows a block diagram of a set of unit blocks of an inverter 136 that provides power output suitable to power one or more loads. Each of the unit blocks may include a slave controller 48, an input active filter 40, an N-phase resonant circuit 42, an N-phase transformer 44, and an N-phase controlled rectifier 46. Further, each of the unit blocks may be electrically coupled in series, in parallel, or any combination thereof, to provide power at larger currents and/or voltages. That is, to increase the amount of current and/or voltage provided by the unit blocks of inverter, additional inverter units may be added in series, in parallel or any combination thereof.

In the illustrated embodiment, the inverter 136 includes a first unit block 138 electrically coupled in parallel to a second unit block 140. The inverter 136 further includes a third unit block 142 electrically coupled in parallel to a fourth unit block 144. The first unit block 138 and the second unit block 140 are electrically coupled in series with the third unit block 142 and the fourth unit block 144. That is, the inverter 136 includes a mix of two couples of inverter units in series with each couple having two units in parallel. Further, the unit blocks may be modular to couple in series or in parallel due to the galvanic isolation of the transformers. By coupling unit blocks in parallel, the inverter may provide an increased total current to the load by dividing the current through each of the phases of the unit blocks. By coupling additional unit blocks in series, the inverter may provide power to the one or more loads at additional voltage levels. While this is shown as an example, a set of inverter units may be coupled in series, parallel, or a mix of both.

Figure 8:
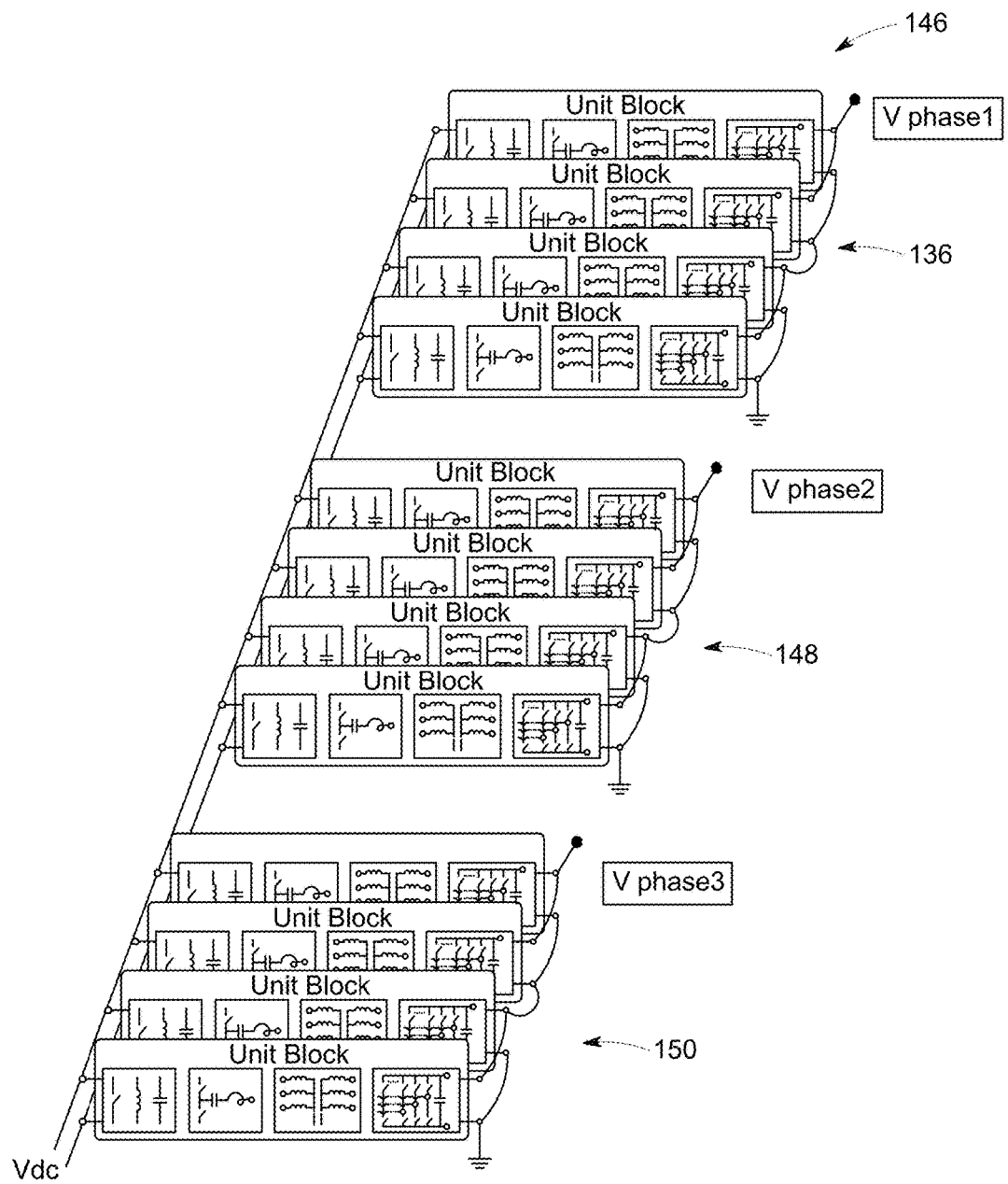
FIG. 8 is a block diagram of output voltages of three multilevel inverters of FIG. 7 that provide three phase power to one or more loads, in accordance with aspects of the present disclosure.

FIG. 8 shows a block diagram of three phase power system 146 that provides power using three inverters. For example, the first inverter 136, a second inverter 148, and a third inverter 150 units may provide a first phase, a second phase, and a third phase of power, respectively, to provide three phase power to a load.

Technical effects of the invention include improving power density, such as in cryogenic power systems. By cooling power electronics using cryofuel, the cryofuel is pre-heated prior to being heated by a vaporizer, thereby reducing power used by the vaporizer. Further, by cooling the power electronics, the power electronics may operate without heat sinks and/or fans, thereby reducing the size of the power electronics. The power provided by the power electronics may operate using a modular multilevel inverter. The multilevel inverter may divide power through multiple modules. Further, each of the modules may include multiple phases. A controller of each of the modules may control switches of the phases to form a summation waveform. By dividing the power between multiple phases, the power electronics circuitry may provide power without the use of a passive filter, thereby reducing losses caused by magnetic material of the passive filter. Further, by reducing magnetic materials and dividing the current through multiple phases, the inverter may enable cryogenic power systems to operate with a reduced size of a vaporizer as well as with reduced electronics.

The word switch, used in this description includes technologies such as IGBTs MOSFETs with or without the antiparallel diodes, as well as different kind of material such as Silicon, Germanium, Silicon Carbide, Gallium Nitride etc. The switch in the rectifier portion can be unidirectional or bidirectional.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A cryogenic fuel power system, comprising:
   an engine;
   a cryogenic fuel supply configured to supply cryogenic fuel to be used as fuel by the engine;
   a cryogenic bus configured to provide the cryogenic fuel from the cryogenic fuel supply to the engine;
   power electronics circuitry configured to convert power from the engine into a form to be applied to one or more loads, wherein the power electronics circuitry is positioned in thermal communication with the cryogenic bus to transfer heat from the power electronics circuitry to the cryogenic fuel;
   wherein the cryogenic bus comprises a conduit and an enclosure that includes a housing of power electronics circuitry, and wherein the cryogenic fuel tank provides cryogenic fuel to the enclosure to place the housing of the power electronics circuitry in thermal communication with the cryogenic fuel;
   wherein the cryogenic power system comprises a plurality of unit blocks, wherein the cryogenic fuel power system is configured to divide power to a plurality of phases of each of the unit blocks of the plurality of unit blocks to power the one or more loads; and
   wherein an output ripple frequency is equal to 2N times a switching frequency of the power electronics circuitry where N is a number of the plurality of phases of each of the unit blocks.

2. The cryogenic fuel power system of claim 1, wherein the cryogenic fuel power system comprises a vaporizer in a fluid flow path between the cryogenic fuel supply and the engine, wherein the vaporizer is sized based at least in part on a temperature of the cryogenic fuel entering the vaporizer.

3. The cryogenic fuel power system of claim 1, wherein each phase of the plurality of phases comprises:
   a resonant circuit that provides a portion of AC power from a DC bus;
   a transformer that galvanically isolates the portion of the AC power between the resonant circuit and a controlled rectifier; and
   the controlled rectifier that operates in conjunction with other controlled rectifiers of the plurality of phases to generate a portion of a summation waveform of power to be applied to the one or more loads.

4. The cryogenic fuel power system of claim 3, wherein each unit block of the plurality of unit blocks comprises a controller configured to control operation the resonant circuit, the controlled rectifier, or both.

5. The cryogenic fuel power system of claim 1, wherein the cryogenic power system comprises a multilevel inverter configured to provide inverted power, without use of a passive filter, to the one or more loads.

6. The cryogenic fuel power system of claim 1, wherein the power electronics circuitry is submerged directly in the cryogenic fuel.

7. A method, comprising:
   flowing a cryofuel from a cryofuel storage to an engine configured to combust a gas generated from the cryofuel;
   between the cryofuel storage and the engine, flowing the cryofuel proximate to power electronics circuitry to reduce a temperature at which the power electronics circuitry operates;

operating the cooled power electronics circuitry to convert electrical power generated by the combustion of the gas by the engine into a form to be applied to one or more loads;

wherein the power electronics circuitry comprises a plurality of unit blocks, wherein the cryogenic fuel power system is configured to divide power to a plurality of phases of each of the unit blocks of the plurality of unit blocks to power the one or more loads; and wherein an output ripple frequency is equal to 2N times a switching frequency of the power electronics circuitry, where N is a number of the plurality of phases of each of the unit blocks.

8. The method of claim 7, wherein the cryofuel is heated en route to the engine by act of cooling the power electronics circuitry.

9. The method of claim 7, wherein the power electronics circuitry converts direct current (DC) electrical power into alternating current (AC) electrical power to be applied to the one or more loads.

10. A power system, comprising:
a vaporizer configured to receive cryofuel and to vaporize the cryofuel into a gas;
an engine configured to receive the gas and to produce rotational energy to be converted to electrical power;
a cryofuel supply configured to provide cryofuel to the vaporizer;
power electronics circuitry configured to convert the electrical power into a form to be applied to one or more loads, wherein the power electronics circuitry is configured to be positioned in thermal communication with the cryofuel to transfer heat produced from operation of the power electronics circuitry to the cryogenic fuel;

wherein the power electronics circuitry comprises a plurality of unit blocks, wherein the cryogenic fuel power system is configured to divide power to a plurality of phases of each of the unit blocks of the plurality of unit blocks to power the one or more loads; and wherein an output ripple frequency is equal to 2N times a switching frequency of the power electronics circuitry, where N is a number of the plurality of phases of each of the unit blocks.

11. The power system of claim 10, wherein the power electronics are configured to preheat the cryofuel prior to entering the vaporizer.

12. The power system of claim 10, comprising a conduit between the vaporizer and the cryofuel supply to transfer the cryofuel from the cryofuel supply to the vaporizer.

13. The power system of claim 12, wherein the power electronics circuitry is configured to be submerged within the cryofuel along the conduit.

14. The power system of claim 12, wherein the power electronics circuitry is housed in a housing, the housing being in thermal communication with the cryofuel.

15. The power system of claim 10, wherein the power electronics circuitry is configured to provide transformed power to the one or more loads by dividing the power over a plurality of phases to limit current through each phase of the plurality of phases, thereby limiting magnetic fields generated by the power electronics circuitry.

16. The power system of claim 10, wherein the power electronics is configured to convert the electrical power to form a sinusoidal waveform, a triangular waveform, a rectangular waveform or a DC waveform.

17. The power system of claim 10, wherein each of the plurality of unit blocks provide a portion of a summation waveform to be applied to the one or more loads.

* * * * *